(12) United States Patent
Wall, II et al.

(10) Patent No.: US 12,109,546 B1
(45) Date of Patent: *Oct. 8, 2024

(54) SYSTEM AND METHOD FOR HEATING GAS IN A CONTINUOUS FOCUSED PATH WITHIN AN ELECTRIC HEATING UNIT

(71) Applicant: First Ammonia Motors, Inc., Concord, NC (US)

(72) Inventors: James L. Wall, II, Concord, NC (US); David Gwynn Kapp, Jr., Concord, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,012

(22) Filed: Mar. 25, 2024

Related U.S. Application Data

(63) Continuation-in-part of application No. 18/540,861, filed on Dec. 14, 2023, now Pat. No. 12,023,643.

(51) Int. Cl.
| | |
|---|---|
| *B01J 19/02* | (2006.01) |
| *B01J 8/06* | (2006.01) |
| *B01J 15/00* | (2006.01) |
| *C01B 3/04* | (2006.01) |
| *F02M 21/02* | (2006.01) |
| *H05B 3/12* | (2006.01) |
| *H05B 3/16* | (2006.01) |

(52) U.S. Cl.
CPC ............ *B01J 19/02* (2013.01); *B01J 8/067* (2013.01); *B01J 15/005* (2013.01); *C01B 3/047* (2013.01); *F02M 21/0206* (2013.01); *F02M 21/0227* (2013.01); *H05B 3/12* (2013.01); *H05B 3/16* (2013.01); *B01J 2208/00398* (2013.01); *B01J 2219/00135* (2013.01); *B01J 2219/00155* (2013.01); *C01B 2203/0277* (2013.01)

(58) Field of Classification Search
CPC .... B01J 19/242; B01J 19/245; B01J 19/2485; B01J 19/0013; B01J 19/02; B01J 2219/023; B01J 2219/0218; B01J 2219/0286; B01J 2219/00132; B01J 2219/00135
See application file for complete search history.

(56) References Cited

U.S. PATENT DOCUMENTS

| | | | |
|---|---|---|---|
| 7,371,361 | B2 | 3/2008 | Singh et al. |
| 2015/0225827 | A1 | 8/2015 | Takasawa et al. |
| 2021/0113983 | A1 | 4/2021 | Mortensen et al. |
| 2022/0389864 | A1 | 12/2022 | Jo et al. |

(Continued)

OTHER PUBLICATIONS

Kudiiarov et al., "State of the Art in Development of Heat Exchanger Geometry Optimization and Different Storage Bed Designs of a Metal Hydride Reactor", Materials 2023, 16, 4891.

(Continued)

*Primary Examiner* — Lessanework Seifu

(57) ABSTRACT

The present invention relates, in general, to a system and method for focusing gas distribution through a series of three-dimensionally (3D) printed lattice heating elements within an electric catalyst unit in order to promote ammonia dissociation. The present invention allows gaseous ammonia to be continuously heated as it flows in series through ceramic tubes containing 3D printed lattice heating elements. The lattice structure of the heating elements provides a balance between surface area and heat dissipation, allowing the heating elements to reach a suitable temperature to perform ammonia dissociation, but which are not oversaturated with heat which could result in failure or melting of the heating elements.

20 Claims, 11 Drawing Sheets

(56) References Cited

U.S. PATENT DOCUMENTS

2023/0056503 A1    2/2023   Westermann et al.
2023/0166247 A1    6/2023   Klein et al.

OTHER PUBLICATIONS

Keshari et al., "Design and investigation of hydriding alloy based hydrogen storage reactor integrated with a pin fin tube heat exchanger", International Journal of Hydrogen Energy, vol. 43, Issue 14, 2018, pp. 7081-7095.

Hydrogen Energy Systems, "Ammonia Cracking using Catalytic Static Mixers (CSM)", Online: https://research.csiro.au/hydrogenfsp/our-research/projects/ammonia-cracking-using-catalytic-static-mixers-csm/, Accessed Dec. 14, 2023.

Emitec Technologies GmbH, "Emicat and EHD Electrically Heated Devices", Online: https://emitec.com/products/emicat-ehd-electrically-heated-devices/, Accessed Dec. 14, 2023.

Thermal Dynamix, Inc. "Ammonia Dissociators", Online: https://www.thermaldynamix.com/ammonia-dissociators, Accessed Dec. 14, 2023.

SYSTEM AND METHOD FOR HEATING GAS IN A CONTINUOUS FOCUSED PATH WITHIN AN ELECTRIC HEATING UNIT

CROSS REFERENCE TO RELATED APPLICATIONS

This application is a continuation-in-part of U.S. Non-Provisional patent application Ser. No. 18/540,861 entitled "SYSTEM AND METHOD FOR HEATING GAS IN A CONTINUOUS FOCUSED PATH WITHIN AN ELECTRIC CATALYST UNIT" filed on Dec. 14, 2023, which is commonly owned, the disclosure of which is incorporated herein by reference in its entirety.

BACKGROUND

Field of the Invention

The present invention relates, in general, to a system and method for focusing gas distribution through a series of three-dimensionally (3D) printed lattice heating elements within an electric catalyst unit in order to promote ammonia dissociation.

Description of Related Art

In an on-board ammonia dissociation system for vehicles, an electric catalyst unit can be utilized during a cold start of an internal combustion engine, or during low load engine operation, where the temperature of the exhaust gas from the engine is relatively low. Electric catalyst units can heat a catalyst to a temperature sufficient to perform ammonia dissociation, however, conventional electric catalyst units require a significant amount of power to do so.

Commercially available catalyst units for ammonia dissociation are typically large and bulky industrial systems that use AC voltage, such as, for example, systems manufactured by Thermal Dynamix Inc.™ of Westfield, MA. These industrial ammonia dissociation systems are not suitable for use on-board vehicles given their size, weight, and large voltage requirements.

Conventional electric catalyst units for vehicles, also referred to as catalytic converters, are well known. These catalyst units typically have a planar metallic conductor through which an electric current is passed. For example, Emitec Technologies GmbH™ of Lohmar, Germany manufactures an electric catalytic converter that is used to treat exhaust gas emissions, and includes a spiral planar conductor. Such planar conductors are used for exothermic reactions.

The ammonia dissociation reaction is highly endothermic, however. With conventional planar conductors, there is usually limited surface area, given the inherent low length-to-diameter ratio, that would allow for an endothermic reaction to absorb sufficient heat into the ammonia gas in order to provide for ammonia dissociation.

Conventional catalytic converters are not designed to contain a significant amount of pressure, as they are used primarily to contain exhaust gas. Consequently, there is not a large pressure differential across the ends of these catalyst converter devices that needs to be sealed. In addition, conventional catalytic converters are typically made from steel, such as, for example, elastomeric steel, which can be prone to leakage and cannot be hermetically sealed. For the purposes of on-board ammonia dissociation, an unsealed device is not suitable, given the risk of pungent, heated ammonia and/or flammable hydrogen being exposed to the environment, the vehicle components, and the vehicle occupants.

Furthermore, catalysts have a minimum temperature, referred to as the light-off temperature, at which the catalyst facilitates the ammonia dissociation reaction, and a maximum operating temperature, which is generally a function of the catalyst and its support structure, if any. For example, it is very common to dispose catalyst material on a metallic support, such as an alumina support. Such supports have a maximum allowed operating temperature.

A disadvantage of known electric catalyst units employing metallic supports is that they are susceptible to failure in environments where the temperature (i.e., thermal load) and/or pressure is too high. Operation in such environments can lead to damage, degradation, and ultimate failure of these support structures devices. Furthermore, in high vibration environments, such as in a vehicle with an internal combustion engine, support structures are subject to significant mechanical stress which can also lead to failure.

For example, at high temperatures, known metallic catalyst support structures can become sintered, (i.e., the metallic support components begin to fuse together). At that point, the efficiency of the catalyst drops dramatically. Consequently, temperatures in excess of 600° C. are typically incompatible with many types of metals.

In addition, known metallic support structures are subject to failure when used in corrosive environments, such as those with heated ammonia, hydrogen, and nitrogen, for example. Heated ammonia is known to have an especially corrosive property, which is characterized by its ability to attack and damage many materials, including steel, stainless steel, copper, brass, aluminum, and some plastics. Heated ammonia is more corrosive than mere gaseous ammonia as heating ammonia causes it to evaporate and form a high concentration of ammonia gas in a confined space, such as within a pressurized electric catalyst unit housing. This high concentration of ammonia gas results in a rapid and extreme chemical attack on metal surfaces, thereby damaging components of the metallic support structures that come into contact the ammonia gas.

Similarly, metals exposed to hydrogen at high temperatures can experience internal decarburization and weakening, which can lead to blistering, cracking, and loss of tensile ductility, all of which can ultimately result in a failure of the support structure.

Therefore, there is a need for an electric catalyst unit capable of reaching temperatures sufficient to perform ammonia dissociation in an efficient manner on-board a vehicle having an internal combustion engine, and which addresses the aforementioned challenges and drawbacks of known electric catalyst units that employ metallic support structures for catalysts with respect to failure during operation in high temperature, high pressure, and/or highly corrosive conditions.

SUMMARY

In an embodiment, the present invention is directed to an electric heating unit for ammonia dissociation, comprising: a housing having a power feed-through, a gas inlet, and a gas outlet; a ceramic tube disposed within the housing and fluidly coupled to the gas inlet; and a heating element having a lattice structure disposed within the ceramic tube, the heating element directly coupled to the power feed-through, wherein gaseous ammonia enters the electric heating unit via the gas inlet and undergoes a dissociation reaction as the gaseous ammonia travels through the ceramic tube.

In another embodiment, the present invention is directed to an electric heating unit for ammonia dissociation, comprising: a housing having a power feed-through, a gas inlet, and a gas outlet; a ceramic tube disposed within the housing and fluidly coupled to the gas inlet; and a heating element having a three-dimensionally (3D) printed lattice structure disposed within the housing, the heating element directly coupled to the power feed-through, wherein gaseous ammonia enters the electric heating unit via the gas inlet and undergoes a dissociation reaction as the gaseous ammonia travels through the ceramic tube.

In yet another embodiment, the present invention is directed to an electric heating unit for ammonia dissociation, comprising: a housing having a power feed-through, a gas inlet, and a gas outlet; a ceramic tube disposed within the housing and fluidly coupled to the gas inlet; and a heating element having a three-dimensionally (3D) printed lattice structure disposed within the housing, the heating element directly coupled to the power feed-through, wherein gaseous ammonia enters the electric heating unit via the gas inlet and undergoes a dissociation reaction as the gaseous ammonia travels through the ceramic tube, and wherein an inner surface of the ceramic tube focuses heat towards the lattice structure.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
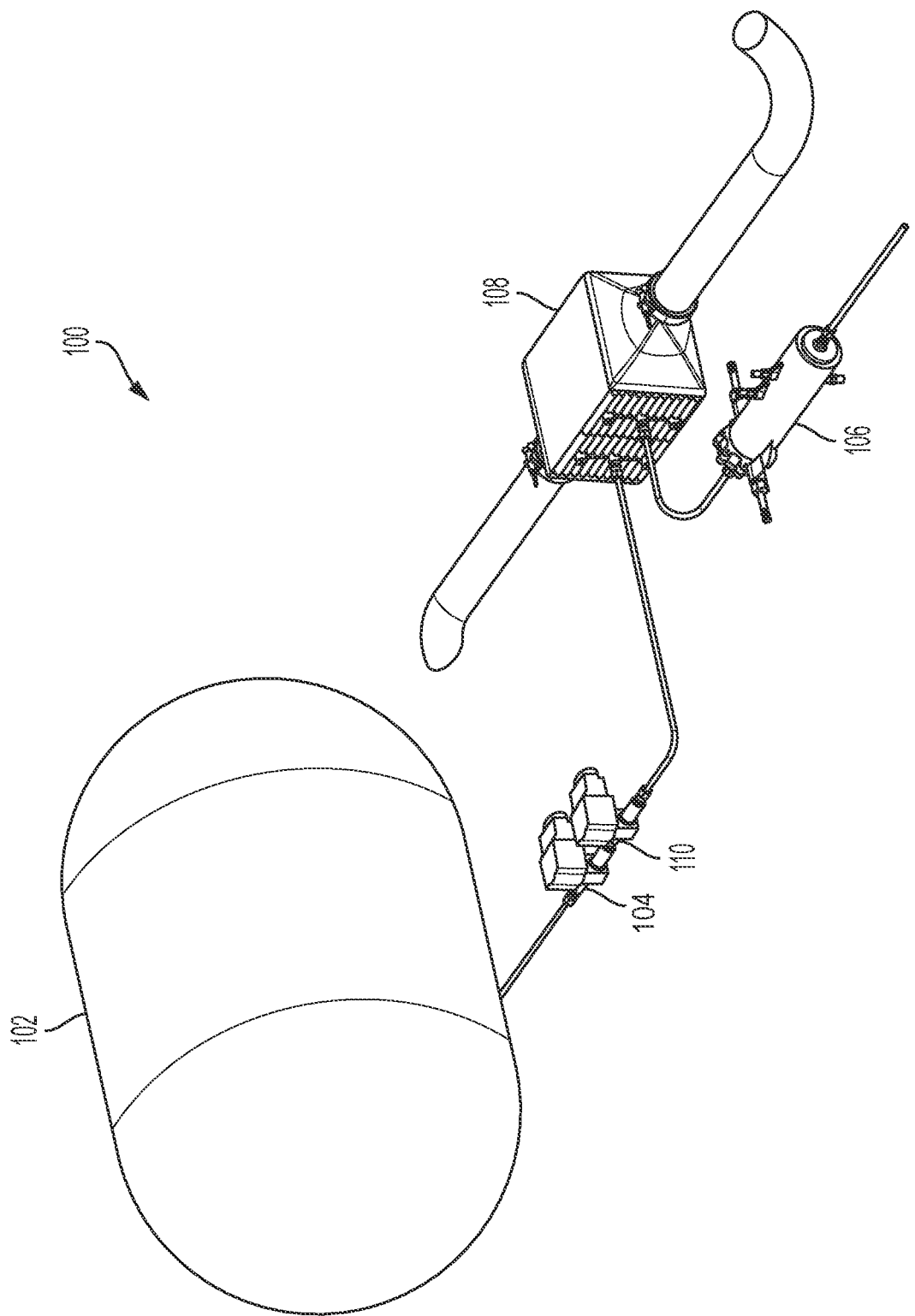
FIG. 1 is a perspective view of an on-board ammonia dissociation system for an internal combustion engine.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "vehicle" refers to any moving vehicle that is capable of carrying one or more human occupants and/or cargo, or which is capable of performing a task, and which is powered by any form of energy. The term "vehicle" includes, but is not limited to: (a) motor vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting dissociation reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the terms "dissociation" and "cracking" refer to a process or processes by which ammonia is dissociated and/or decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel®, such as, for example, Inconel® 625, Inconel® 718, Inconel® 725, and other compound metals having nickel as a main component. Inconel® is the trademark of Special Metals Corporation of Huntington, West Virginia, and is a nickel-chromium-based superalloy often utilized in extreme environments where components are subjected to high temperature, pressure, or mechanical loads.

As used herein, the term "ceramic" refers to silicon nitride ceramic, ceramic glass, steatite ceramic, fused quartz, glass, and other non-conductive ceramic materials.

As used herein, the term "lattice" refers to a structure where unit cells are repeated at one or more respective points of a periodic array, resulting in a structure that appears the same from any point.

As used herein, the term "three-dimensional printing" and "three-dimensionally printed" refer to a three-dimensional object obtained via an additive manufacturing process, where the object has a height, a width, and a length. Additive manufacturing processes are those in which material is deposited, joined, or solidified under computer control, with the material being added together, typically layer by layer.

As used herein, the terms "seal" and "sealed" refer to protection from harmful effects of ambient environmental conditions. Such protection includes protection against differences in pressure, temperature, fluid/humidity, electrical potential, shock, and gaseous compositions. These terms also refer to a hermetic, vacuum, air-tight, and/or gas-tight environment within a housing, such as in a pressure vessel.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an internal combustion engine for a vehicle, it is understood that the system could be implemented in any engine-driven setting that may be powered by ammonia and/or hydrogen fuel.

FIG. 1 is a perspective view of an on-board ammonia dissociation system 100 for an internal combustion engine. The on-board ammonia dissociation system 100 is described in commonly owned U.S. patent application Ser. No. 18/241,328 filed on Sep. 1, 2023, entitled "SYSTEMS AND METHODS FOR THE CATALYTIC PRODUCTION OF HYDROGEN FROM AMMONIA ON-BOARD MOTOR VEHICLES", which is incorporated by reference herein.

In an embodiment, an ammonia liquid tank 102 is mounted to a motor vehicle or engine. The ammonia liquid tank 102 can be coupled to a pump. In an embodiment, the tank 102 is refillable and/or replaceable.

In an embodiment, a temperature control valve 104 receives a temperature feedback signal that contains a temperature reading from an electric catalyst unit 106 during a cold start of the engine. The temperature feedback signal can be generated by a thermocouple coupled to the electric catalyst unit 106. Once the electric catalyst unit 106 reaches a threshold temperature (i.e., the temperature reading is equal to or greater than the threshold temperature) suitable to perform the ammonia dissociation process, the temperature control valve 104 opens and the gaseous ammonia passes through the heat exchange catalyst unit 108, and travels downstream to the electric catalyst unit 106, which is heated using power supplied from the vehicle power system.

If the electric catalyst unit 106 has not reached the threshold temperature, then the temperature control valve 104 continues to monitor the temperature feedback signal, and prevents the downstream travel of the gaseous ammonia to the electric catalyst unit 106.

In an embodiment, the temperature of the heated exhaust gas entering the heat exchange catalyst unit 108 is judged based on the current draw in the electric catalyst unit 106, where the current draw is indicative of how effective the heat exchange catalyst unit 108 is in cracking the gaseous ammonia.

For example, if there is hydrogen and nitrogen passing from the heat exchange catalyst unit 108 to the electric catalyst unit 106, the electric catalyst unit 106 will not perform the ammonia dissociation process, and thus will draw minimal or no current.

If, however, gaseous ammonia passes from the heat exchange catalyst unit 108 to the electric catalyst unit 106, the ammonia dissociation process will occur, drawing current in order to heat the heating element (i.e., the lattice structure 304 described herein, and depicted in FIGS. 3 through 8) disposed within the electric catalyst unit 106.

However, during a normal or high load operating conditions of the engine (i.e., not during a cold start or low load operating conditions), the on-board ammonia dissociation system 100 does not utilize the electric catalyst unit 106 to perform the ammonia dissociation process, and the heat exchange catalyst unit 108 performs the ammonia dissociation process as it will have been heated to the threshold temperature by the exhaust gas from the engine.

In an embodiment, the pressure control valve 110 is located in series with the temperature control valve 104, and controls the amount of gaseous ammonia which is fed into the heat exchange catalyst unit 108.

In an embodiment, to facilitate a cold start of the on-board ammonia dissociation system 100 when the exhaust gas from the engine is not at a threshold temperature suitable to perform the ammonia dissociation process, the electric catalyst unit 106 is used to heat the catalyst so that the gaseous ammonia can be cracked, and the resulting hydrogen is to be supplied to the downstream injection system for the engine. The engine can then burn the hydrogen, powering the engine which results in heated exhaust gas being supplied to the on-board ammonia dissociation system 100.

Figure 2:
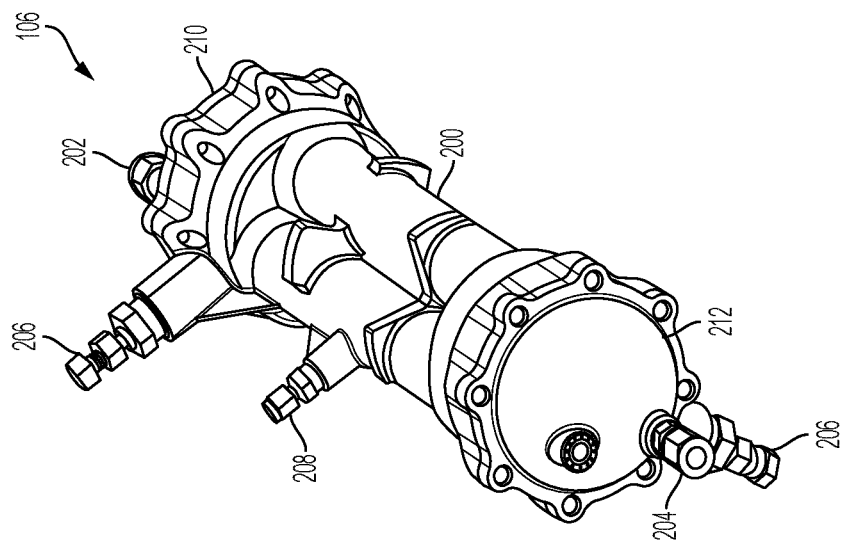
FIG. 2 is a perspective view of an electric catalyst unit, according to an embodiment of the present invention.

FIG. 2 is a perspective view of an electric catalyst unit 106, according to an embodiment of the present invention. The electric catalyst unit 106 comprises a housing 200, an inlet 202, an outlet 204, at least one power feed-through 206, at least one radial fitting 208, and covers 210, 212. In an embodiment, the housing 200 is a metal housing, and in a preferred embodiment, the housing 200 is made from a nickel alloy such as Inconel®.

In an embodiment, the electric catalyst unit 106 includes covers 210, 212 disposed on opposite ends of the housing 200. The covers 210, 212 are removably coupled to the housing 200 such that they can be removed in order to service or replace the lattice structures 304 contained within the housing 200. In another embodiment, only one of the covers 210, 212 is removable. In an embodiment, the inner surfaces of the covers 210, 212 can be coasted with a ceramic paste that forms a thermal barrier and increases the thermal efficiency of the electrical catalyst unit 106.

In an embodiment, the inlet 202 is disposed on cover 210, and the outlet 204 is disposed on cover 212. The inlet 202 and outlet 204 can be removably attached to respective covers 210, 212 so that different inlets and outlets having various dimensions, sizes, and flow properties can be utilized with the electric catalyst unit 106 in a modular fashion.

In an embodiment, the inlet 202, the outlet 204, and the covers 210, 212 can be made from the same metallic material as the housing 200. In another embodiment, the inlet 202, the outlet 204, and the covers 210, 212 can be made from stainless steel, silver, bronze, and comparable alloys. In an embodiment, the covers 210, 212 seal the electric catalyst unit 106 in an air-tight fashion.

The electric catalyst unit 106 includes at least one power feed-through 206 for heating the lattice structures 304. The power feed-through 206 is described in commonly owned U.S. patent application Ser. No. 18/388,296 filed on Nov. 9, 2023, entitled "APPARATUS FOR AN ELECTRIC FEED- THROUGH FOR HIGH TEMPERATURE, HIGH PRESSURE, AND HIGHLY CORROSIVE ENVIRONMENTS", which is incorporated by reference herein.

The power feed-through 206 is coupled on one end to the vehicle power system, such as a traditional vehicle battery, and provides electrical current to the electric catalyst unit 106. In another embodiment, the power feed-through 206 is coupled to a supplemental heating/electric source, such as a renewable energy source, a portable battery source, an on-board electric battery pack, and/or a rechargeable battery. In an embodiment, the vehicle power system provides 12V to 24V of direct current (DC). The higher the voltage that is utilized, the less current that is needed to be managed through components of the electric catalyst unit 106.

In an embodiment, the electric catalyst unit 106 could be employed in a hybrid vehicle setting, where an internal combustion engine has a 48V battery that is utilized for kinetic energy recovery, and which is recharged during regenerative braking operations. The 48V battery could be utilized by the electric catalyst unit 106 during a cold start operation.

On one end, the power feed-through 206 is coupled to a lattice structure 304, and electric current from the vehicle power system flows from the power feed-through 206 to the lattice structure 304. In an embodiment, each lattice structure 304a-c is coupled to a respective power feed-through 206.

In another embodiment, the power feed-through 206 is electrically coupled to the first lattice structure 304a, which is electrically coupled to the second lattice structure 304b via conductor 316. The second lattice structure 304b is electrically coupled to the third lattice structure 304c via conductor 404.

Similarly, the first tube 302a is fluidly coupled to the second tube 302b via the second chamber 300b, and the second tube 302b is fluidly coupled to the third tube 302c via the third chamber 300c.

This configuration allows gaseous ammonia to be continuously heated as it flows in series through the tubes 302a-c. In an embodiment, gaseous ammonia (1) enters the first chamber 300a via the inlet 202, (2) flows through the first tube 302a, (3) enters the second chamber 300b, (4) flows through the second tube 302b, (5) enters the third chamber 300c, (6) flows through the third tube 302c, and (7) exits the electric catalyst unit 106 via the outlet 204 as decomposed constituent hydrogen and nitrogen components.

In an embodiment, the electric catalyst unit 106 can include at least one radial fitting 208 that may be used for a variety of functions. For example, the radial fittings 208 may serve as inlets, outlets, or may be coupled to equipment for temperature, throughput, and/or pressure sensing, such as thermocouples, transducers, flow meters, and the like.

Figure 3:
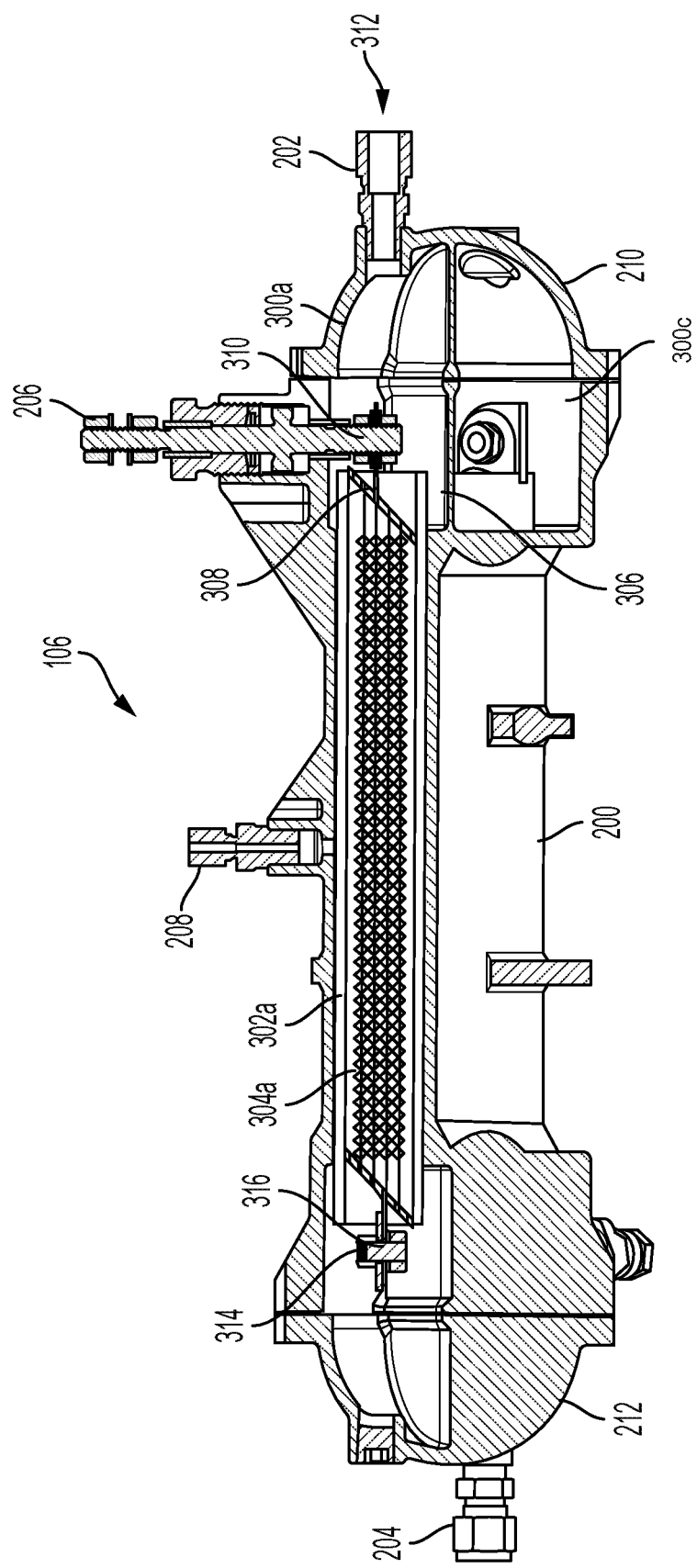
FIG. 3 is a lateral cross-sectional view of the electric catalyst unit showing a first chamber, according to an embodiment of the present invention.

FIG. 3 is a lateral cross-sectional view of the electric catalyst unit 106 showing a first chamber 300a, according to an embodiment of the present invention. The first chamber 300a is fluidly coupled to the inlet 202, and includes a first tube 302a where a first lattice structure 304a is disposed. A wall 306 separates the first chamber 300a from a third chamber 300c. Numeral 312 indicates the flow of gaseous ammonia through the inlet 202, and into the first chamber 300a.

In an embodiment, during a cold start operation of the on-board ammonia dissociation system where exhaust gas from the internal combustion engine is not at a threshold temperature suitable to perform the ammonia dissociation process, gaseous ammonia flows from the heat exchange catalyst unit 108 to the inlet 202 of the electric catalyst unit 106.

In an embodiment, the electricity supplied to the lattice structure 304 is regulated via an electronic controller coupled to the power feed-through 206 that utilizes readings from a thermocouple (not shown) coupled to the radial fitting 208. The thermocouple obtains a temperature reading of the gas surrounding the lattice structure 304, and the electronic controller regulates the current flowing to the lattice structure 304 based on the temperature reading, in order to maintain a threshold temperature suitable to perform the ammonia dissociation process. The threshold temperature can range from 400° C. to 700° C., and in a preferred embodiment, the threshold temperature is at least 600° C. In an embodiment, the thermocouple does not physically contact the lattice structure 304.

In an embodiment, the surfaces of the lattice structure 304 are coated with a catalyst that facilitates the ammonia dissociation process. The catalyst can be coated to the lattice structure 304 using a washcoating or deposition technique to bind or adhere the catalyst to the surfaces of the lattice structure 304. In an embodiment, the inner surface of the tube 302 can also be coated with the catalyst. The catalyst can be coated to the inner surface of the tube 302 using a washcoating or deposition technique to bind or adhere the catalyst to the wall surfaces.

In addition to, or alternatively to, coating the lattice structure 304 and/or the inner surface of the tube 302, catalyst, such as discrete catalyst media or powder, is deposited into the tube 302 around the lattice structure 304.

In an embodiment, the tube 302 is made from ceramic and acts as an insulator, thereby allowing heat to be focused and reflected toward the lattice structure 304, which in turn promotes heating of the catalyst.

In an embodiment, the lattice structure 304 is removably secured within the tube 302, such that various types, forms, and shaped lattice structures can be interchangeably utilized with the electric catalyst unit 106 in a modular fashion.

In an embodiment, the lattice structure 304 has a flange 308 that is coupled to an electrical contact 310 of the power feed-through 206. The lattice structure 304 is a heating element and acts as an electrical resistor working on the principle of Joule heating, whereby an electric current from the power feed-through 206 is converted into heat as it flows through the lattice structure 304. In other words, the electric current energizes the lattice structure 304, causing the lattice structure to emit heat. In another embodiment, the electrical contact 310 of the power feed-through 206 is directly coupled to the lattice structure 304.

Figure 4:
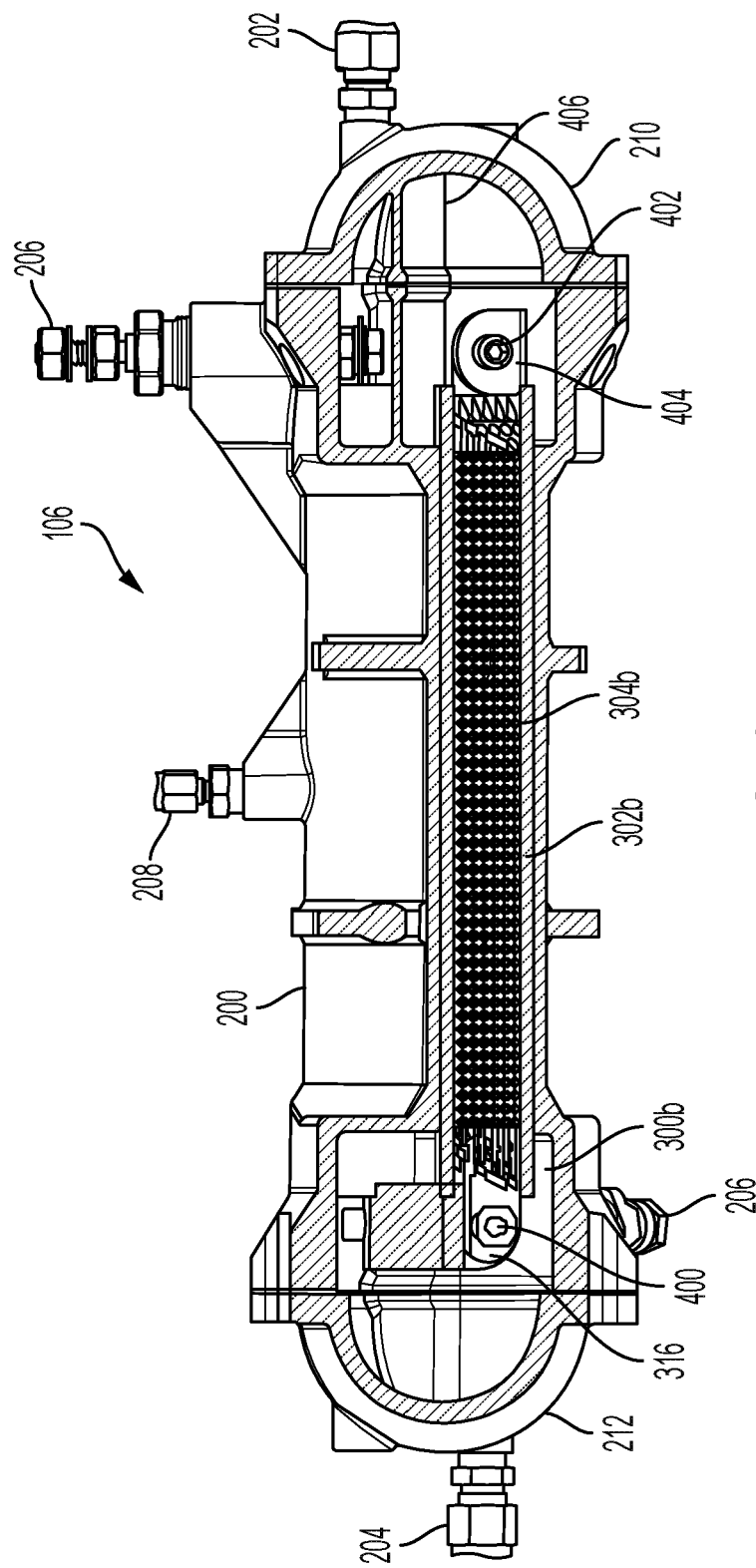
FIG. 4 is a lateral cross-sectional view of the electric catalyst unit showing a second chamber, according to an embodiment of the present invention.

The first lattice structure 304a is electrically coupled to the second lattice structure 304b via a conductor 316 that is secured within the electric catalyst unit 106 via fasteners 314 and 400 (as shown in FIG. 4). Electric current flowing through the first lattice structure 304a flows to the second lattice structure 304b via the conductor 316.

As the first lattice structure 304a emits heat, the gaseous ammonia undergoes a chemical reaction with the catalyst, and a gas mixture of resulting hydrogen and nitrogen components, as well as residual uncracked gaseous ammonia, travels through an outlet end of first tube 302a and into a second chamber 300b (as shown in FIG. 4). The gas mixture then flows into an inlet end of the second tube 302b. The second chamber 300b fluidly couples the first tube 302a and the second tube 302b.

FIG. 4 is a lateral cross-sectional view of the electric catalyst unit 106 showing the second chamber 300b, according to an embodiment of the present invention. The gas mixture flowing through the outlet end of the first tube 302a enters the second chamber 300b. The second chamber 300b includes the second tube 302b which contains the second lattice structure 304b, which is identical, or substantially similar, to the first lattice structure 304a disposed in the first tube 302a in the first chamber 300a. The second lattice structure 304b is electrically connected to the first lattice structure 304a via the conductor 316, and electrical current passing through the second lattice structure 304b is also converted into heat. In an embodiment, another power feed-through 206 can be coupled to the second lattice structure 304b and provides electric current thereto.

Figure 5:
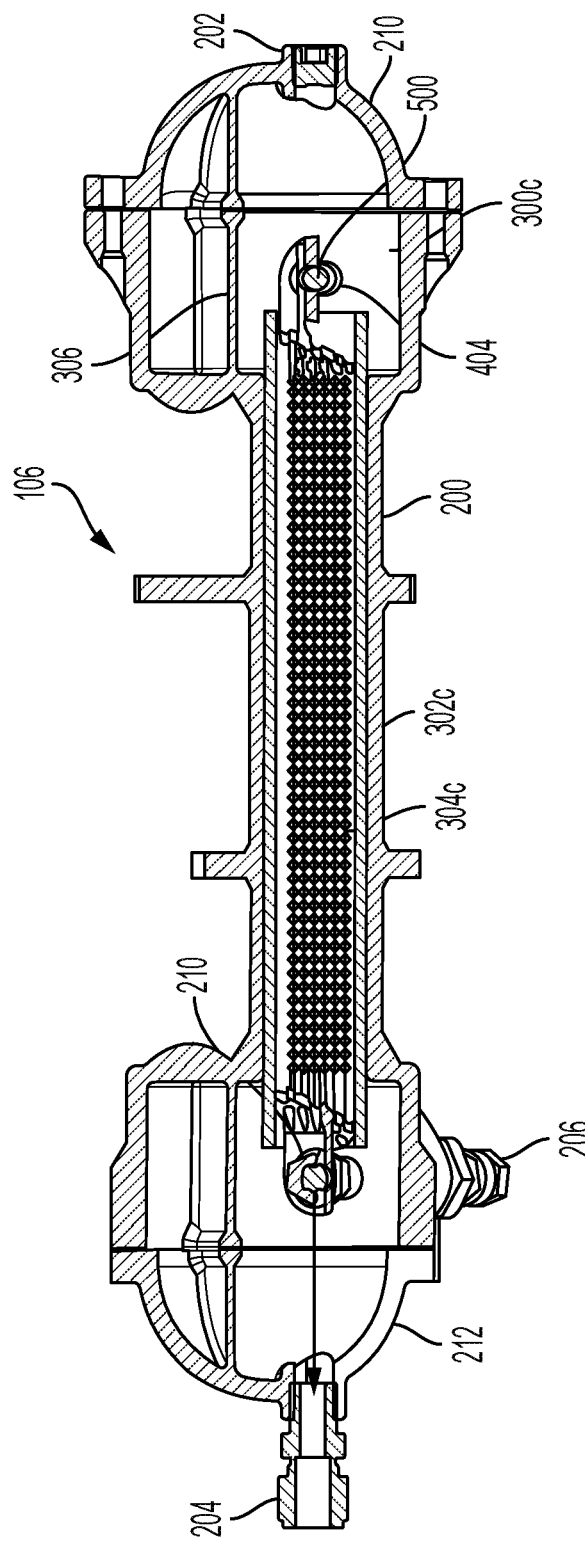
FIG. 5 is a lateral cross-sectional view of the electric catalyst unit showing a third chamber, according to an embodiment of the present invention.

As the second lattice structure 304b emits heat, the gas mixture in the second chamber 300b undergoes a chemical reaction with the catalyst. A gas mixture of resulting hydrogen and nitrogen components, as well as residual uncracked gaseous ammonia, travels through an outlet end of the second tube 302b and into a third chamber 300c (as shown in FIG. 5). The gas mixture then flows into an inlet end of the third tube 302c. A wall 406 separates the second chamber 300b from the first chamber 300a, and forces the gas mixture to flow into the inlet of the third tube 302c. The third chamber 300c fluidly couples the second tube 302b to the third tube 302c.

FIG. 5 is a lateral cross-sectional view of the electric catalyst unit 106 showing the third chamber 300c, according to an embodiment of the present invention. The gas mixture flowing through the outlet of the second tube 302b enters the third chamber 300c. The third chamber 300c is coupled to the third tube 302c which contains a third lattice structure 304c, which is identical, or substantially similar, to lattice structures 304a and 304b in the first and second tubes 302a, 302b, respectively. The third lattice structure 304c is electrically connected to the second lattice structure 304b via the conductor 404, and electrical current passing through the third lattice structure 304c is also converted into heat. In an embodiment, another power feed-through 206 can be coupled to the third lattice structure 304c and provides electric current thereto.

As the lattice structure 304c emits heat, the gas mixture in the third tube 300c undergoes a chemical reaction with the catalyst. A gas mixture of resulting hydrogen and nitrogen components flows through the outlet 204 and is supplied as fuel, or co-fuel along with ammonia, to the injection system for the internal combustion engine.

The present invention provides for a continuous flow of the gaseous ammonia and resulting gas mixture throughout the series of chambers 300a-c and respective tubes 302a-c housing respective lattice structures 304a-c. The continuous heating of the gaseous ammonia via each lattice structure 304a-c in series allows for a high temperature to be maintained throughout the flow path which is necessary for an endothermic ammonia dissociation reaction.

While the electric catalyst unit 106 has been described herein with three chambers, any number of chambers with respective tubes and lattice structures could be included in the electric catalyst unit 106. Each additional chamber having a respective tube with a respective lattice structure increases the surface area that the gaseous ammonia and gas mixture comes into contact with as it traverses though the series of chambers of the electric catalyst unit 106.

In another embodiment, the first tube 302a and second tube 302b could be fluidly coupled via a conduit (not shown), and the second tube 302b and the third tube 302c can also be fluidly coupled via a respective conduit (not shown). These conduits would permit the gas mixture to flow through the series of tubes 302a-c.

Figure 6:
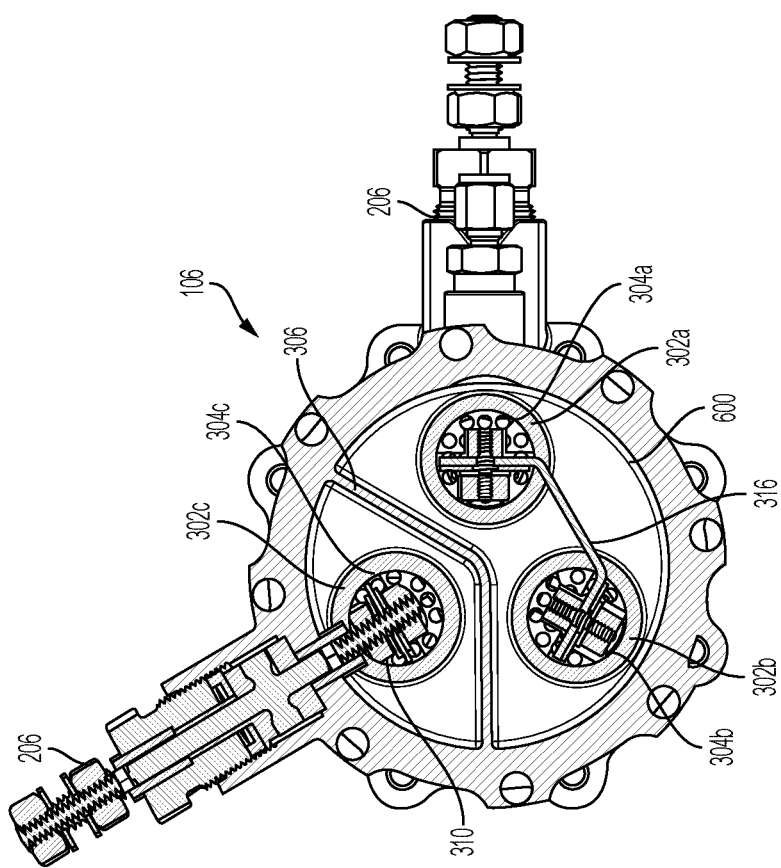
FIG. 6 is a side cross-sectional view of a gas outlet end of the electric catalyst unit, according to an embodiment of the present invention.

FIG. 6 is a side cross-sectional view of a gas outlet end of the electric catalyst unit 106, according to an embodiment of the present invention. In an embodiment, the first tube 302a is electrically connected to the second tube 302b via conductor 316, thereby providing an electrical connection between the first lattice structure 304a and the second lattice structure 304b.

Figure 7:
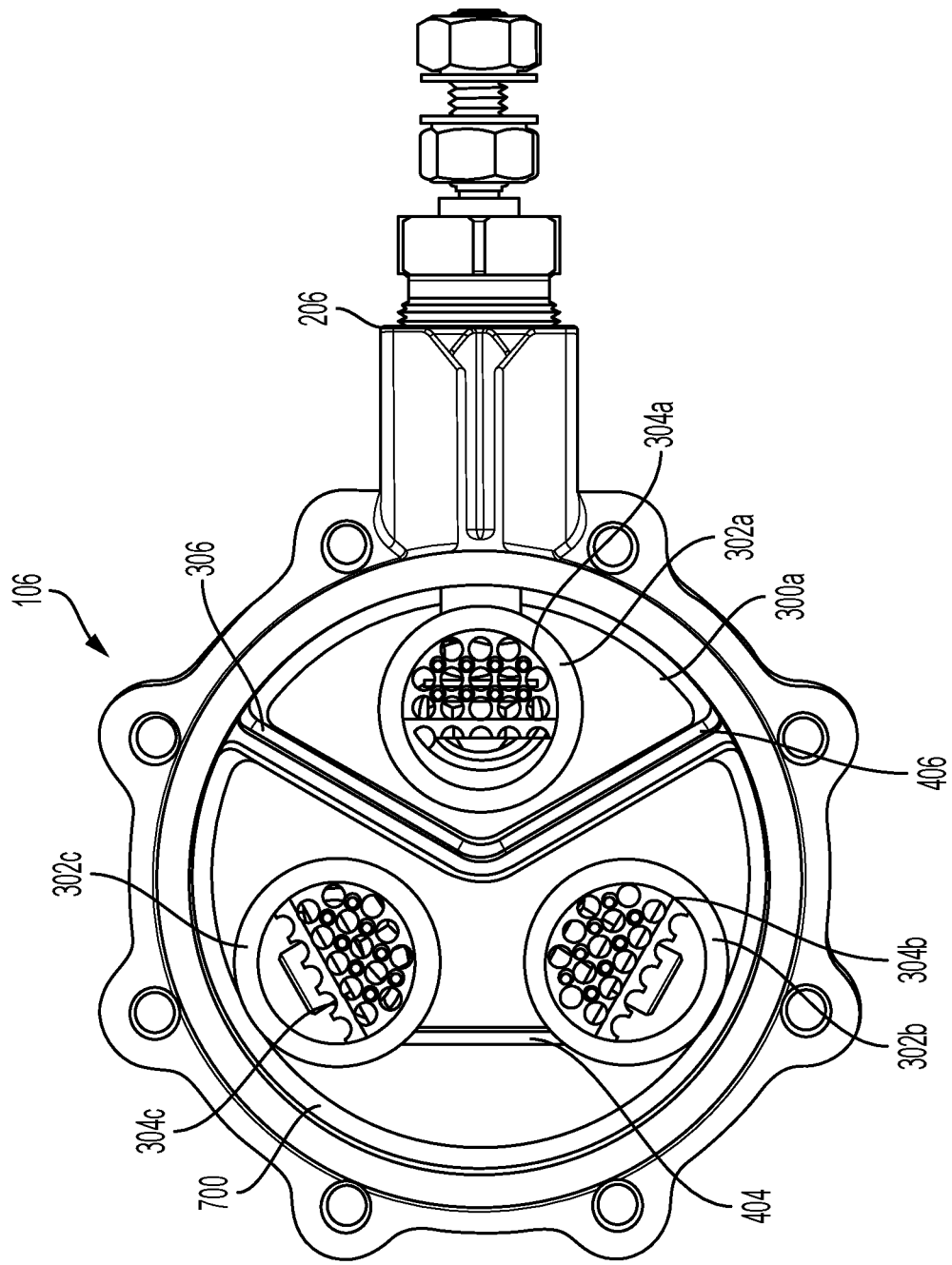
FIG. 7 is a side cross-sectional view of a gas inlet end of the electric catalyst unit, according to an embodiment of the present invention.

FIG. 7 is a side cross-sectional view of a gas inlet end of the electric catalyst unit 106, according to an embodiment of the present invention. In an embodiment, the third tube 302c is electrically connected to the second tube 302b via conductor 404, thereby providing an electrical connection between the lattice structure 304c and the second lattice structure 304b.

Figure 8:
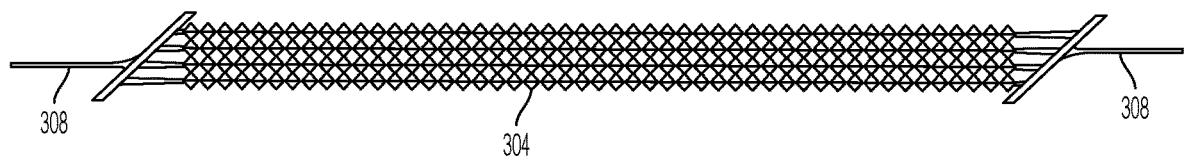
FIG. 8 is a lateral view of a lattice structure, according to an embodiment of the present invention.

FIG. 8 is a lateral view of a lattice structure 304, according to an embodiment of the present invention. Each opposing end of the lattice structure 304 includes an integral flange 308. In an embodiment, the lattice structure 304 and flanges 308 are one continuous 3D printed structure. In an embodiment, the lattice structures 304 and flanges 308 are made from a nickel alloy, and in a preferred embodiment, the lattice structures 304 and flanges 308 are made from Inconel®.

Figure 9:
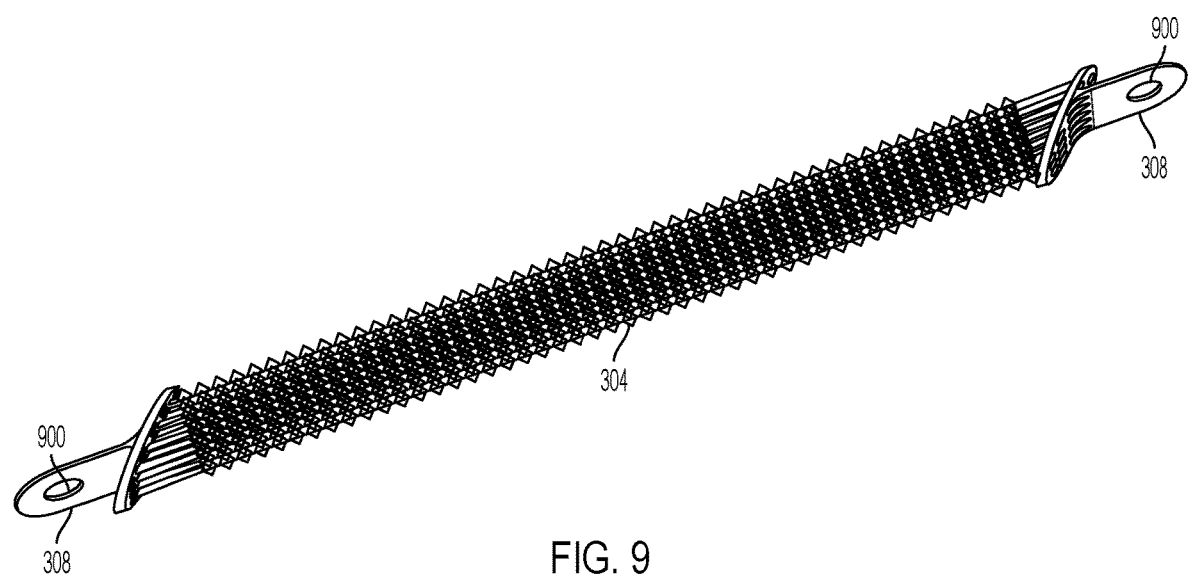
FIG. 9 is a perspective view of the lattice structure, according to an embodiment of the present invention.

FIG. 9 is a perspective view of the lattice structure 304, according to an embodiment of the present invention. In an embodiment, each flange 308 includes an aperture 900 that allows the flange 308 to be connected to components within the housing 200, such as, for example, power feed-throughs 206, radial fittings 208, and/or components. The use of the apertures 900 as a connection mechanism is not intended to be in any way limiting, and the lattice structure 304 can include any type of connection mechanism, such as, for example, a clip, snap-fit, interlocking, male/female, jaw, disc, and/or gear coupling, that can maintain integrity and withstand the high temperature, high pressure, and highly corrosive environment within the electric catalyst unit 106.

Figure 10:
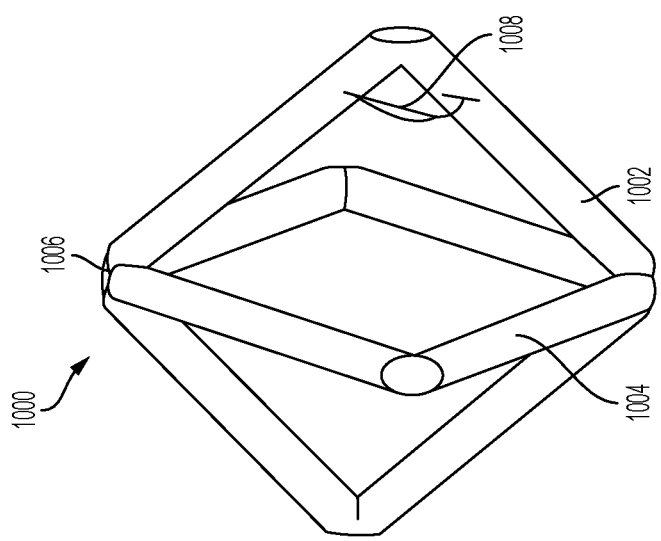
FIG. 10 is a perspective view of a lattice cell, according to an embodiment of the present invention.

FIG. 10 is a perspective view of a lattice cell 1000, according to an embodiment of the present invention. The lattice structure 304 is comprised of a series of 3D printed lattice cells 1000 forming a periodic array, as shown in FIGS. 7 and 8. Each lattice cell 1000 is a unit that repeats in a direction perpendicular to a center length line of the lattice structure 304, such that the lattice structure 304 is 3D printed as one continuous structure.

In an embodiment, each lattice cell 1000 forms an octahedron shape and comprises a first square 1002 and second square 1004 that are formed in a perpendicular fashion with one another.

The lines of the squares 1002, 1004 form an electrical resistor, such that multiple lattice cells 1000 form an electrical resistor network. In an embodiment, each of the vertices 1008 of the lattice cell 1000 has a minimum angle of 45 degrees to allow for equal electrical resistance and heat dissipation, such that gas can be heated continuously as it traverses the length of the lattice structure 304. An angle smaller than 45 degrees may cause the electrical resistance to increase, thereby lowering the heat dissipation and efficacy of an endothermic ammonia dissociation reaction linearly along the lattice structure 304.

It is noted however, that the octahedron shape is an illustrative example and is not intended to be in any way limiting, and various shaped lattice cells could be utilized for the lattice structure 304, as long as the shapes do not provide a high electric resistance that impedes heat dissipation linearly along the lattice structure 304. Furthermore, the lattice cells must have a shape and form that allows them to be self-supporting since the lattice structure is 3D printed, have a suitable surface area that can bind catalyst media, and have a power density-to-surface area ratio that does not cause the metallic lattice cells to exceed their melting point.

In an embodiment, each lattice cell has a power density-to-surface area ratio less than or equal to 70 W per square inch. In a preferred embodiment, each lattice cell has a power density-to-surface area ratio between 35 W per square inch to 55 W per square inch.

For example, the length and width of the lattice cells could be altered such that the resistance of the lattice cells is modified. The specific resistance of the lattice cells dictates the amount of heat dissipated. As the surface area of each lattice cell is increased, with the same current flowing through the lattice structure, the surfaces of the lattice cells will not get as hot. Conversely, as the surface area of each lattice cell is reduced, with the same current flowing through the lattice structure, the surfaces of the lattice cells may be oversaturated with heat, and could exceed the melting point of the metallic material making up the lattice cells.

Thus, the power density-to-surface area ratio, and the resistance, of each lattice cell must have a design that allows for a balance between the surface area and heat dissipation, such that the lattice structure reaches a suitable temperature to perform ammonia dissociation, but does not oversaturate with heat which could lead to failure or melting of the lattice structure.

In an embodiment, the lattice cells could be shaped in the form of a cylinder (i.e., rod), sphere, cube, cone, torus, pyramid, prism, or any other polyhedron, such as, but not limited to, a tetrahedron, pentahedron, hexahedron, heptahedron, octahedron, nonahedron, decahedron, hendecahedron, dodecahedron, icosahedron, and the like, and the lattice cells can have sides in the form of a square, diamond, rectangle, parallelogram, triangle, circle, hexagon, quadrilateral, trapezium, heptagon, octagon, nonagon, decagon, pentagon, rhombus, and the like. In yet another embodiment, the lattice cells could have a random geometry, a Voronoi structure, or a triply period minimal surface (TPMS) structure.

Figure 11:
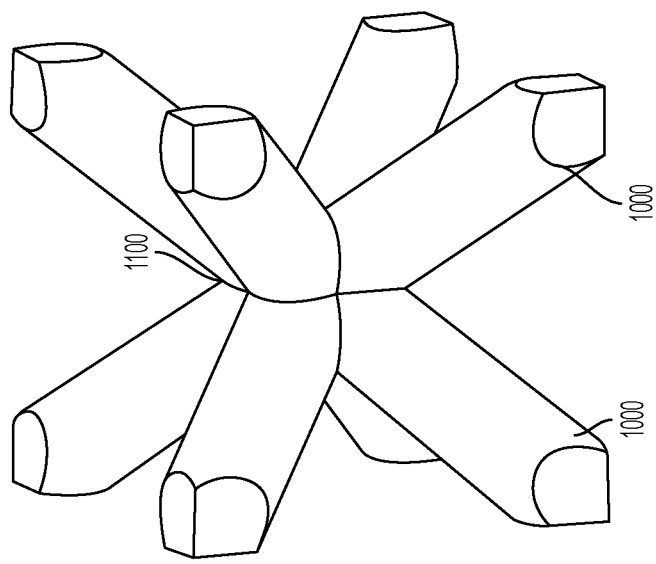
FIG. 11 is a perspective view of a coupling between multiple lattice cells, according to an embodiment of the present invention.

FIG. 11 is a perspective view of a coupling between multiple lattice cells 1000, according to an embodiment of the present invention. In an embodiment, each lattice cell 1000 is integrally formed via 3D printing with an adjacent lattice cell 1000 along a coupling 1100. The coupling 1100 creates an electric connection between each lattice cell 1000, allowing the multiple lattice cells 1000 to form an electrical resistor network.

While the principles of the disclosure have been illustrated in relation to the exemplary embodiments shown herein, the principles of the present invention are not limited thereto and include any modification, variation, or permutation thereof.

The invention claimed is:

1. An electric heating unit for ammonia dissociation, comprising:
   a housing having a power feed-through, a gas inlet, and a gas outlet;
   a ceramic tube disposed within the housing and fluidly coupled to the gas inlet; and
   a heating element having a lattice structure comprising a series of lattice cells disposed within the ceramic tube, the heating element directly coupled to the power feed-through,
   wherein gaseous ammonia enters the electric heating unit via the gas inlet and undergoes a dissociation reaction as the gaseous ammonia travels through the ceramic tube, and
   wherein each lattice cell is formed with two identical shapes arranged in a perpendicular fashion with one another.

2. The electric heating unit of claim 1, wherein the lattice structure is a three-dimensionally (3D) printed structure consisting of the series of lattice cells.

3. The electric heating unit of claim 1, wherein the ceramic tube is made from a material selected from silicon nitride ceramic, glass, or fused quartz.

4. The electric heating unit of claim 1, wherein the heating element is made from a nickel alloy.

5. The electric heating unit of claim 1, wherein the heating element is made from a nickel-chromium-based superalloy.

6. The electric heating unit of claim 1, where the lattice structure is coated with a catalyst.

7. The electric heating unit of claim 1, where the ceramic tube is filled with a discrete catalyst media.

8. The electric heating unit of claim 1, wherein an inner surface of the ceramic tube focuses heat towards the lattice structure.

9. An electric heating unit for ammonia dissociation, comprising:
   a housing having a power feed-through, a gas inlet, and a gas outlet;
   a ceramic tube disposed within the housing and fluidly coupled to the gas inlet; and
   a heating element having a three-dimensionally (3D) printed lattice structure comprising a series of lattice cells disposed within the housing, the heating element directly coupled to the power feed-through,
   wherein gaseous ammonia enters the electric heating unit via the gas inlet and undergoes a dissociation reaction as the gaseous ammonia travels through the ceramic tube, and
   wherein each lattice cell consists of six vertices, each vertex having an angle of at least 45 degrees.

10. The electric heating unit of claim 9, wherein the lattice structure is coated with a catalyst.

11. The electric heating unit of claim 9, wherein the ceramic tube is made from a material selected from silicon nitride ceramic, glass, or fused quartz.

12. The electric heating unit of claim 9, wherein the heating element is made from a nickel alloy.

13. The electric heating unit of claim 9, wherein the heating element is made from a nickel-chromium-based superalloy.

14. The electric heating unit of claim 9, wherein each lattice cell is formed with two squares arranged in a perpendicular fashion with one another.

15. The electric heating unit of claim 9, wherein each lattice cell consists of six vertices, each vertex having an angle of 90 degrees.

16. The electric heating unit of claim 9, wherein an inner surface of the ceramic tube focuses heat towards the lattice structure.

17. An electric heating unit for ammonia dissociation, comprising:
   a housing having a power feed-through, a gas inlet, and a gas outlet;
   a ceramic tube disposed within the housing and fluidly coupled to the gas inlet; and
   a heating element having a three-dimensionally (3D) printed lattice structure comprising a series of lattice cells disposed within the housing, the heating element directly coupled to the power feed-through, wherein gaseous ammonia enters the electric heating unit via the gas inlet and undergoes a dissociation reaction as the gaseous ammonia travels through the ceramic tube, wherein an inner surface of the ceramic tube focuses heat towards the lattice structure, and wherein each lattice cell is formed with two squares arranged in a perpendicular fashion with one another.

18. The electric heating unit of claim 17, wherein the surfaces of the 3D printed lattice structure are coated with the catalyst using a washcoating or deposition technique.

19. The electric heating unit of claim 17, wherein each lattice cell consists of six vertices, each vertex having an angle of at least 45 degrees.

20. The electric heating unit of claim 17, wherein the heating element is made from a nickel alloy.

* * * * *